United States Patent [19]

Iizuka et al.

[11] 4,165,610
[45] Aug. 28, 1979

[54] INTERNAL COMBUSTION ENGINE WITH VARIABLE CYLINDER DISABLEMENT CONTROL

[75] Inventors: Haruhiko Iizuka; Seishi Yasuhara, both of Yokosuka, Japan

[73] Assignee: Nissan Motor Company, Limited, Yokohama, Japan

[21] Appl. No.: 858,860

[22] Filed: Dec. 8, 1977

[30] Foreign Application Priority Data

Dec. 10, 1976 [JP] Japan .......................... 51/164728[U]

[51] Int. Cl.² .............................................. F01N 3/15
[52] U.S. Cl. ...................................... 60/284; 60/285; 123/127; 123/198 F
[58] Field of Search ................. 60/276, 285, 284, 282; 123/127, 32 EE, 119 RL, 198 F

[56] References Cited

U.S. PATENT DOCUMENTS

| | | | |
|---|---|---|---|
| 3,673,989 | 7/1972 | Manaka | 123/127 |
| 3,756,205 | 9/1973 | Frost | 60/299 |
| 3,800,772 | 4/1974 | Gospodar | 60/284 |
| 4,007,590 | 2/1977 | Nagai | 123/198 F |
| 4,023,358 | 5/1977 | Maurer | 60/285 |
| 4,034,733 | 7/1977 | Noguchi | 123/127 |
| 4,064,844 | 12/1977 | Matsumoto | 123/198 F |

*Primary Examiner*—Douglas Hart

[57] ABSTRACT

A multicylinder internal combustion engine is provided with a means for disabling several cylinders when reduced power can adequately operate the vehicle and an exhaust gas treatment device. An additional fuel injector is provided to increase fuel quantity when the temperature within the treatment device falls below its operating temperature to compensate for the temperature reduction due to the sucking of air to the exhaust system through the disabled cylinders.

4 Claims, 5 Drawing Figures

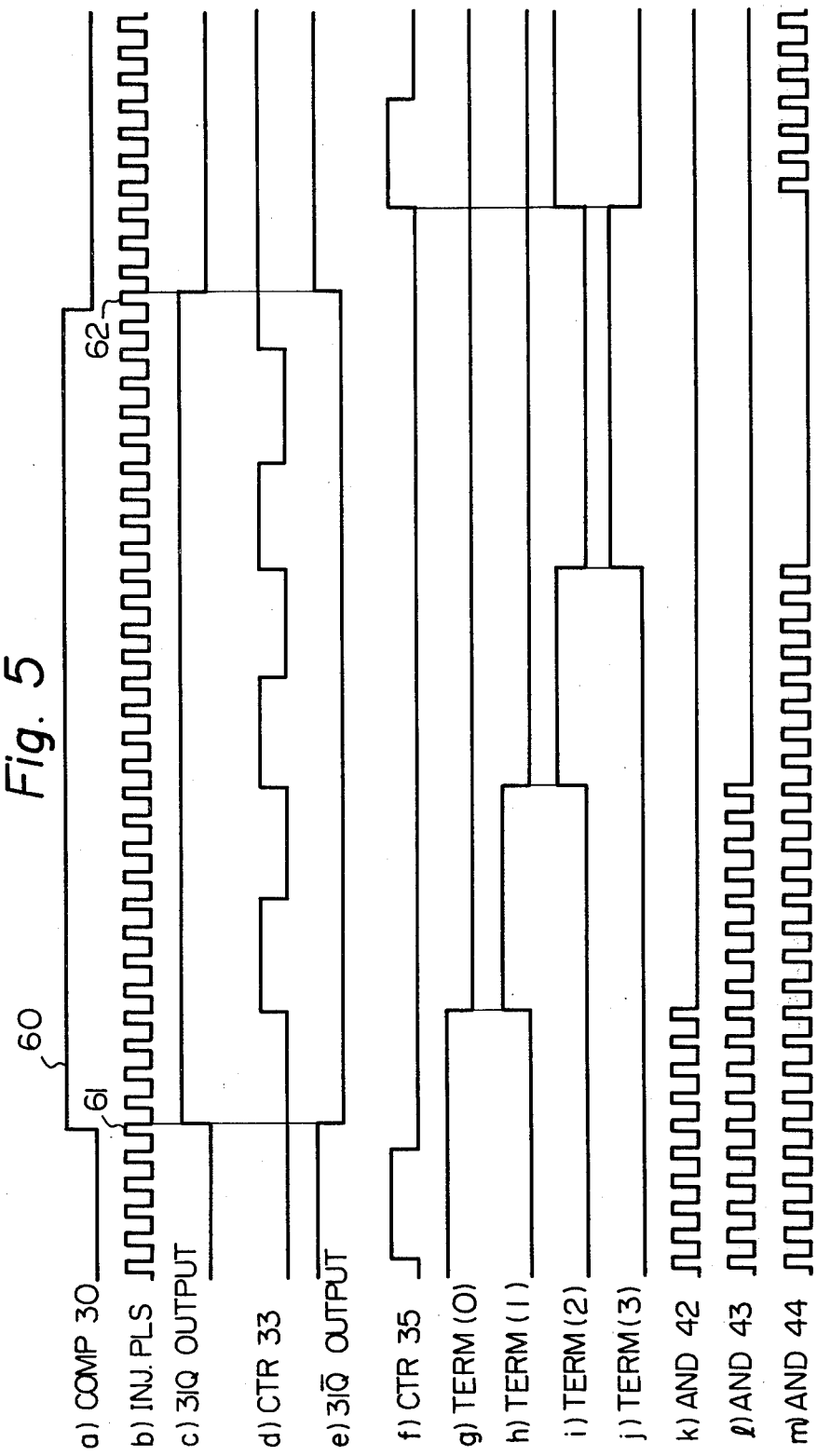

INTERNAL COMBUSTION ENGINE WITH VARIABLE CYLINDER DISABLEMENT CONTROL

BACKGROUND OF THE INVENTION

The present invention relates to multicylinder internal combustion engines including exhaust gas treatment devices wherein certain of the cylinders is deactivated in response to a sensed engine power demand when reduced engine power can adequately operate the vehicle.

Variable cylinder disablement is known in the art as an effective means to improve fuel economy by selectively shutting off fuel supply to several cylinders of the engine when reduced power output can operate the vehicle adequately. This disablement, known as variable displacement control, is particularly advantageous for application to electronic fuel injection because the fuel injectors can be electronically disabled to cut off fuel without having the need for mechanical parts to shut off intake valves as would be required in carbureted engines. However, the combined use of variable displacement control with exhaust gas treatment devices such as catalytic converters or thermal reactors would accompany disadvantages in the operation of such devices since the disabled cylinders draw in air which consequently increase the amount of air in the exhaust system so that the temperature of the exhaust gases tends to drop below the normal operating range of the gas treating device.

SUMMARY OF THE INVENTION

An object of the invention is to provide a multicylinder internal combustion engine which comprises a variable displacement cylinder control unit with which several cylinders of the engine are disabled at light loads, an exhaust gas treatment device and a booster fuel injector operable to inject additional fuel to the engine when the temperature within the exhaust passage is reduced to a level below the operating range of the treating device, whereby the additional fuel may be inducted to the activated cylinders and through the disabled cylinders to the treatment device where it serves as a reactant to increase the temperature therein until the operating temperature thereof is reached.

Another object of the invention is to reduce the noxious components of the exhaust emissions while at the same time providing fuel economy by shutting off several cylinders when reduced engine output power can operate the vehicle adequately.

BRIEF DESCRIPTION OF THE DRAWINGS

The invention will be further described with reference to the accompanying drawings, in which:

FIG. 5 is a timing diagram useful for describing the operation of the variable disablement control unit.

DESCRIPTION OF THE PREFERRED EMBODIMENT

Figure 1:
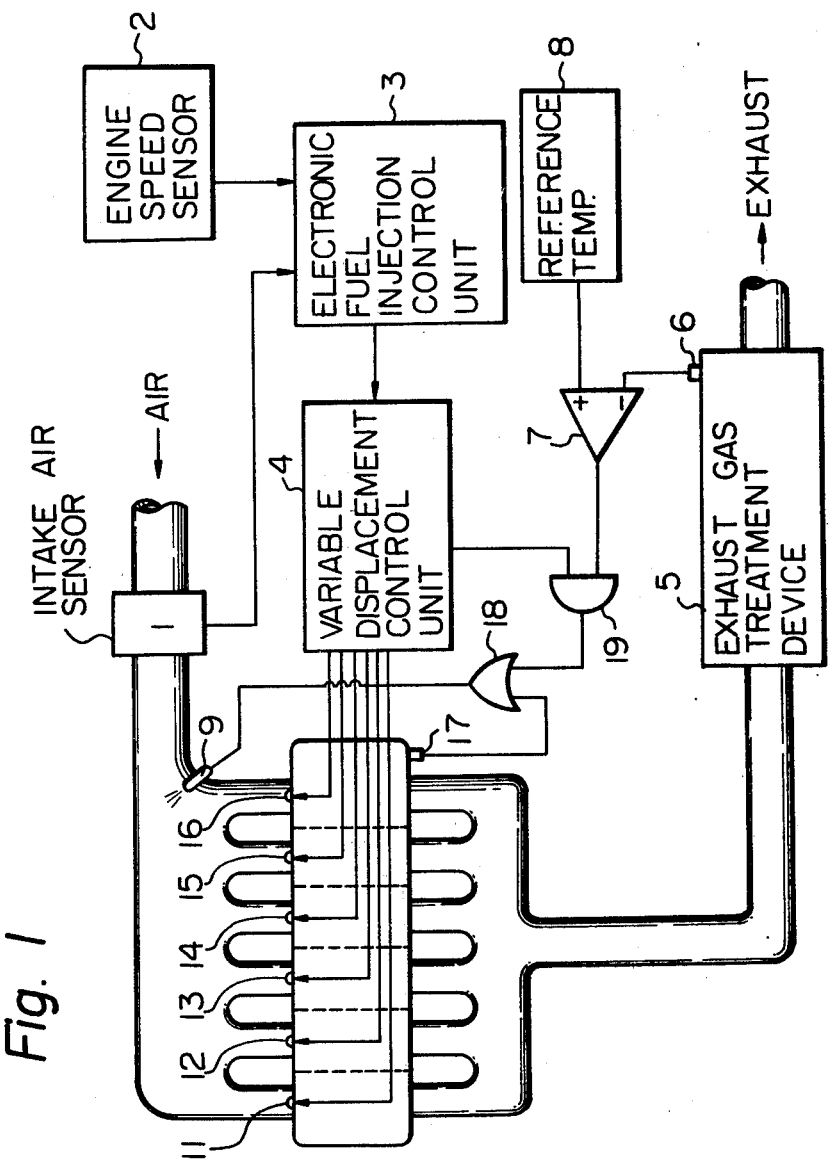
FIG. 1 is a functional block diagram of an embodiment of the invention.

Referring now to FIG. 1, an electric fuel injection control unit 3 receives input signals from an intake vacuum sensor 1 and an engine speed sensor 2 to determine the width of injection pulses to be supplied to fuel injectors 11 through 14 of a six-cylinder internal combustion engine 10 through a variable displacement control unit 4. As is well known in the art, the fuel injection control unit 3 processes the input signals by dividing the sensed volume of air inducted per given unit time by the sensed engine speed to obtain intake air volume per engine revolution to which the width of the injection pulse is proportional. As will be described below the variable displacement control unit 4 distributes the received injection pulses to the fuel injectors and inhibits the application of the pulses in response to the level of power the engine is required to deliver. At full load all the fuel injectors are activated to deliver a maximum output power, while at part-throttle operations certain of the cylinders are deactivated by shutting off the corresponding fuel injectors in response to the reduced engine load.

An exhaust gas treatment device 5 such as catalytic converter or thermal reactor is provided to convert the noxious gases into harmless products. These treatment devices varies in performance as a function of temperature and the conversion efficiency is at a maximum when the temperature within the exhaust system of the engine is in the normal operating range of the treatment device. A temperature 6 is provided to provide a signal representative of the temperature of the gas treatment system 5 to the inverting input of a comparator 7, whose noninverting input is connected to receive a reference voltage representing the normal operating temperature of the treatment system. If the treatment device is a catalytic converter, the reference temperature is set in a range from 300° C. to 500° C. A range of 600° C. to 800° C. may be appropriate as the reference temperature for thermal reactors.

To accelerate engine warm-up under cold start, the engine 10 is provided with a fuel booster nozzle 9 which injects fuel in response to a signal supplied from an engine temperature sensor 17 via an OR gate 18. The engine temperature sensor 9 senses the engine coolant temperature and activates the booster injector 7 when the detected temperature is below a predetermined level.

An AND gate 19 is provided whose first input is connected to the output of the comparator 7 and whose second input is connected to an output from the variable displacement control unit 4, the output of the AND gate 13 being connected to the booster injector 9 via OR gate 18.

When the temperature of the exhaust gas treatment system 5 falls below the reference value set by the circuit 8 to represent the normal operating temperature of the system 5, the comparator 7 will generate a logic "1" level output to the AND gate 19, which is enabled to pass the output from the displacement control unit 4 to the boosting injector 9 through OR gate 18. As described later, the output from the variable displacement control unit 4 is an injection pulse to be fed to an injector at an appropriate timing and this injection pulse is applied to the booster injector 9 when the exhaust temperature as sensed by sensor 6 falls below the normal operating temperature of the exhaust treatment device 5 so that the engine is fed with an additional amount of fuel that serves to increase the exhaust temperature to the normal range. Such temperature drops will occur when certain of the engine cylinders is deactivated when reduced engine output power can operate the vehicle under light load conditions such as cruising.

Figure 2:
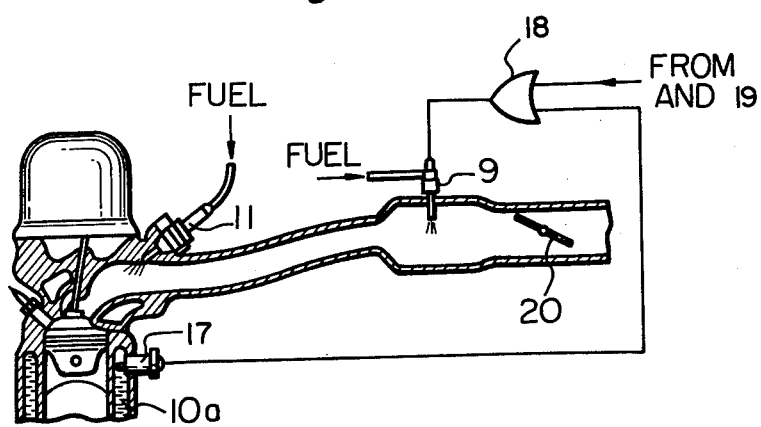
FIG. 2 is a partial cross-section of the engine.

FIG. 2 illustrates a cross-section of the cylinder No. 1 with the first fuel injector 11 mounted closed to the intake port thereof and the booster injector 9 mounted upstream from the injector 11 and downstream from throttle control valve 20. The engine temperature sensor 17 is mounted to be exposed to the engine coolant confined within the chamber 10a.

Figure 3:
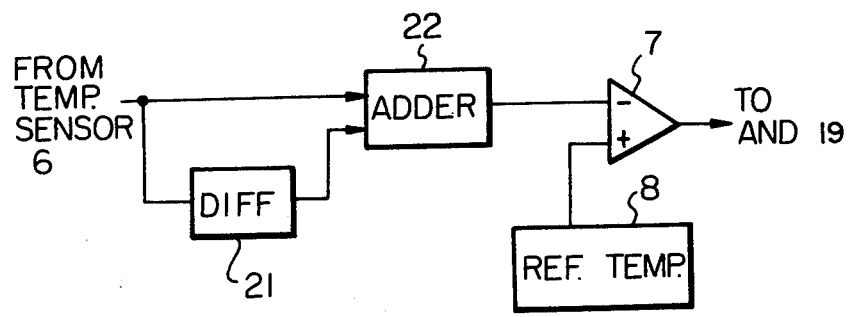
FIG. 3 is a temperature sensing circuit of FIG. 1.

As illustrated in FIG. 3, the output from the temperature sensor 6, which senses the temperature of exhaust treatment system 5, is differentiated by a differentiating circuit 21 whose output is coupled to an input of an adder 22 whose second input is connected to receive the sensor 6 output. The output from the adder 22 is applied to the inverting input of the comparator 7 for comparison with the reference voltage from reference temperature circuit 8.

The differentiator 21 provides an output proportional in amplitude to the rate of change of the exhaust temperature variation, so that the higher the rate of temperature change the greater the differentiator output becomes. The output from the adder 22 is thus a summation of the direct output from the sensor 6 and the rate-proportional signal from the differentiator 21. With the differentiator 21, the system becomes more sensitive to variations of the exhaust temperature, so that it can respond quickly to rapid reduction of the exhaust temperature to effect supply of additional fuel to the engine.

Figure 4:
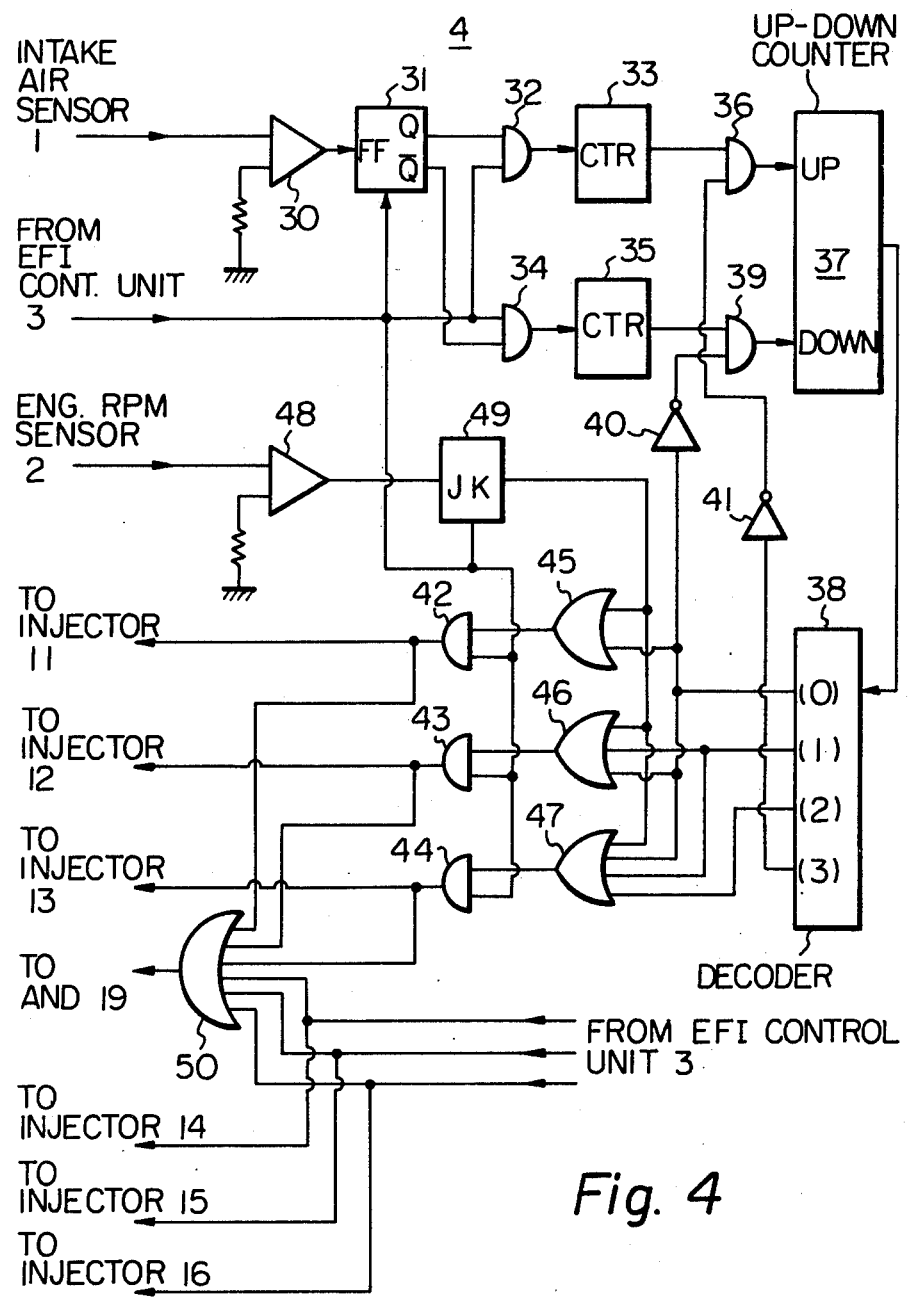
FIG. 4 is a variable disablement control unit of FIG. 1.

FIG. 4 an example of the circuitry of the variable displacement control unit is illustrated. A comparator 30 is provided to compare the signal representing the intake vacuum from the sensor 1 with a reference value and provides a logic "1" output to a J-K flip-flop 31 when the absolute pressure in the intake passage falls below the atmospheric pressure. The flip-flop 31 is fed with injection pulses from the EFI control unit 3 so that upon the occurrence of a logic "1" output 60 (see FIG. 5a) from the comparator 30 enables the flip-flop 31 to switch its output binary states in response to the trailing edge of an injection pulse 61 (FIG. 5b) with the result that the Q output of flip-flop 31 goes high as illustrated in FIG. 5c. As a result, an AND gate 32 is enabled to pass injection pulses from control unit 3 to a binary counter 33 which provides an output for each count of a predetermined number of input pulses as illustrated in FIG. 5d while the absolute intake pressure is below the predetermined level.

The $\bar{Q}$ output of flip-flop 31 (FIG. 5e) is high during the time prior to the occurrence of the signal 60 and enables an AND gate 34 to pass the injection pulses to a binary counter 35 which provides an output for each count of a predetermined number of input pulses as illustrated in FIG. 5f during the time when the intake vacuum is above the reference level. An AND gate 36 is connected to the output of the counter of 33 to pass it to the up-count terminal of an up-down counter 37 when enabled by an output from a binary-to-decimal decoder 38. Likewise, an AND gate 39 is provided to apply the output of counter 35 to the down-count terminal of the up-down counter 37 when enabled by another output from the decoder 38. It will be appreciated that the up-down counter 37 is in the up-count mode when the vehicle demands less output power and in the down-count mode when the vehicle demand is high.

The decoder 38 has its input connected to the output of the up-down counter 37 to decode the binary count output of the counter 37 into a decimal representation which appears in succession at the outputs of decoder 38. The terminals (0), (1), (2) and (3) signify the decimal number of the binary count, so that the presence of a logic "1" only at terminal (2) represents the decimal number 2, for example, and this number represents the number of cylinders to be deactivated.

The terminal (0) of the decoder 38 is connected by an NOT circuit 40 to an input of the AND gate 39 and the terminal (3) of the decoder 38 is connected by an NOT circuit 41 to the other input of the AND gate 36. Therefore, AND gates 36 and 39 will be enabled except when the corresponding terminals of the decoder 38 are at logic "1" level and as a result the logic "1" output appears in succession across the terminals (0) through (3) and then back again from terminals (3) to (0), as illustrated in FIGS. 5g through 5j.

The output terminal (0) of decoder 38 is connected to AND gates 42, 43 and 44 via OR gates 45, 46 and 47, respectively the output terminal (1) being connected to AND gates 43 and 44 via OR gates 46 and 47, respectively and the terminal (2) being connected to AND gate 44 via OR gate 47.

The output from the engine speed sensor 2 is applied to an input of a comparator 48 for comparison with a reference level applied to the other input thereof and provides a logic "1" output to a J-K flip-flop 49 when the sensed engine speed is below the reference level. The J-K flip-flop 49 receives injection pulses from the control unit to change its output binary state in step with the trailing edge of the applied injection pulse in the presence of a logic "1" output from the comparator 48. A logic "1" output from the flip-flop 49 is coupled to the AND gates 42, 43 and 44 via OR gate 45, 46 and 47, respectively, to simultaneously enable the AND gates 42 through 44, the outputs from the AND gates 42 to 44 being coupled to the fuel injectors 11 through 13, whereby these injectors are activated by the injection pulse supplied from the EFI control unit 3 through the enabled AND gates when the engine speed is below the predetermined value, regardless of the engine output power level. In this instance injection pulses from the control unit 3 are also applied to injectors 14 through 16 so that when the engine speed is lower than the predetermined level, all of the injectors are activated to give maximum output power.

The output terminals of the AND gates 42 to 44 and the injection pulses from the control unit 3 for the injectors 14 to 16 are also coupled to the AND gate 19 through an OR gate 50.

The engine also delivers a full output power when the AND gates 42, 43 and 44 are all enabled simultaneously by a logic "1" output on the terminal (0).

As long as the pulse 60 from comparator 30 is present, the up-down counter 37 receives input pulses from the AND gate 36 and shifts its output pulse from the terminal (0) to terminal (3) so that the injectors 11, 12 and 13 are disabled in succession as illustrated in FIGS. 5k, 5l and 5m. The three-cylinder displacement mode continues until the comparator 30 output falls to the low voltage level in response to an engine demand requiring more output power. The $\bar{Q}$ output of flip-flop 31 will rise at the trailing edge of an injection pulse 62 (FIGS. 5b and 5c) to enable AND gate 34 to feed injection pulses to the counter 35. Since the (0) terminal of the decoder 38 is at the logic "0" level, AND gate 39 is enabled to pass the output from the counter 35 to the down-count input of the up-down counter 37, which starts to decrease the number of disabled injectors, i.e.

injectors 11, 12 and 13. In response to an output from the counter 35, the decoder 38 shifts its output from the terminal (3) to (0) as long as the comparator 30 output remains low.

The injection pulses through OR gate 50 are applied to the AND gate 19 (FIG. 1). When this AND gate is enabled by the output from the comparator 7, an injection pulses from the OR gate 50 is applied to the booster injector 9 via OR gate 18 so that additional amount of fuel is injected to the activating cylinders when the exhaust temperature falls below the operating level of the exhaust gas treatment device 5.

As described previously, when the engine speed falls below the preset value, AND gates 42, 43 and 44 are all enabled to suspend cylinder deactivation. This is effective in preventing engine vibrations which become appreciable when the engine speed is low.

What is claimed is:

1. A multicylinder internal combustion engine including an intake manifold and a fuel injector for each of the cylinders of the engine adapted when activated for discharging fuel thereto, comprising:
    means disposed in the exhaust passage of said engine for reducing the amount of noxious components of the emissions, said reducing means being normally operable when the temperature of the emissions is in a predetermined range;
    means for detecting when the level of output power required of the engine falls below a preset value;
    means for disabling certain of said fuel injectors when said power falls below said preset value, whereby air is drawn through the disabled cylinders to said reducing means resulting in a lowering of the temperature within said reducing means;
    means for providing a signal when the temperature within said reducing means falls below said normal operating temperature range; and
    means provided in said intake manifold for supplying fuel to all of said cylinders in response to said signal to thereby increase the temperature within said reducing means toward said operating range.

2. A multicylinder internal combustion engine as claimed in claim 1, wherein said disabling means comprises an up-down counter operable in up-counting and down-counting modes depending upon an input signal applied thereto to vary the number of disabled fuel injectors in succession when the detected level of the engine power remains at a level above or below said preset value, means responsive to the output from said power level detecting means for supplying said input signal to said up-down counter for operating the same in one of said up-counting and down-counting modes, and gating means for supplying injection pulses to said fuel injectors selectively in accordance with the contents of said up-down counter.

3. A multicylinder internal combustion engine as claimed in claim 1, wherein said signal providing means comprises a temperature sensor, a differentiator connected to said temperature sensor for differentiating the output of said sensor, an adder receptive of the output from said sensor and said differentiated output, a comparator having a first input connected to the output of said adder and a second input receptive of a reference voltage representing said normal operating temperature of said noxious gas reducing means.

4. A multicylinder internal combustion engine as claimed in claim 1, further comprising means for sensing the temperature of said engine to activate said fuel supplying means to supply additional fuel to said engine when said engine temperature is below a preset value.

* * * * *